United States Patent
Zhang et al.

(10) Patent No.: US 12,095,898 B2
(45) Date of Patent: Sep. 17, 2024

(54) BLOCKCHAIN-BASED PRIVACY PROTECTION METHOD FOR CONTENT CENTRIC NETWORK (CCN)

(71) Applicant: Zhengzhou University of Light Industry, Zhengzhou (CN)

(72) Inventors: Jianwei Zhang, Zhengzhou (CN); Haiyan Sun, Zhengzhou (CN); Zengyu Cai, Zhengzhou (CN); Liang Zhu, Zhengzhou (CN); Shujun Liang, Zhengzhou (CN); Erlin Tian, Zhengzhou (CN); Huanlong Zhang, Zhengzhou (CN); Yanhua Zhang, Zhengzhou (CN); Xi Chen, Zhengzhou (CN)

(73) Assignee: Zhengzhou University of Light Industry, Zhengzhou (CN)

(*) Notice: Subject to any disclaimer, the term of this patent is extended or adjusted under 35 U.S.C. 154(b) by 294 days.

(21) Appl. No.: 17/863,414

(22) Filed: Jul. 13, 2022

(65) Prior Publication Data
US 2023/0043852 A1 Feb. 9, 2023

(30) Foreign Application Priority Data
Jul. 13, 2021 (CN) .......................... 202110788755.2

(51) Int. Cl.
H04L 9/14 (2006.01)
H04L 9/06 (2006.01)

(52) U.S. Cl.
CPC .............. *H04L 9/0637* (2013.01); *H04L 9/14* (2013.01)

(58) Field of Classification Search
CPC ................................ H04L 9/0637; H04L 9/14
See application file for complete search history.

(56) References Cited

U.S. PATENT DOCUMENTS 10,469,248 B2 * 11/2019 Chalakudi ............ H04L 63/0435
10,797,885 B1 * 10/2020 Griffin ................. G06F 16/1805
(Continued)

FOREIGN PATENT DOCUMENTS

CN 109039649 A 12/2018
CN 110557439 A 12/2019
(Continued)

OTHER PUBLICATIONS

Zhu Dali, et al., A Survey of Security in Content Centric Networking, Journal of Cyber Security, 2020, pp. 121-143, vol. 5, No. 5.
(Continued)

*Primary Examiner* — William S Powers
(74) *Attorney, Agent, or Firm* — Bayramoglu Law Offices LLC

(57) ABSTRACT

A blockchain-based privacy protection method for a CCN includes: executing, by a trusted AAC, an initialization algorithm to generate common parameters and a master key, generating a public key and a private key for each consumer and publisher, and randomly generating, by the trusted AAC, its own public key and private key; calculating a public key, and generating ciphertext and uploading the ciphertext to a CSP; performing transaction on-chaining; and during decryption, finding, by the consumer, transaction information of the content on the consortium blockchain, sending an interest packet based on the transaction information, and obtaining ciphertext CT through a storage address in the transaction information; generating, by the consortium blockchain, an access transaction based on access information of the consumer; sending the ciphertext CT to the consumer through a data packet; and locally decrypting, by the consumer, the ciphertext CT, and verifying correctness of the content.

13 Claims, 6 Drawing Sheets

(56) References Cited

U.S. PATENT DOCUMENTS

| | | | |
|---|---|---|---|
| 2008/0240447 A1* | 10/2008 | Zhu | H04L 9/3271 |
| | | | 380/30 |
| 2018/0082024 A1* | 3/2018 | Curbera | G06F 21/00 |
| 2018/0225466 A1 | 8/2018 | Ducatel et al. | |
| 2019/0251270 A1* | 8/2019 | Liu | G06F 21/602 |
| 2019/0253245 A1 | 8/2019 | Zhang et al. | |
| 2020/0201679 A1* | 6/2020 | Wentz | G06F 9/468 |
| 2021/0266170 A1* | 8/2021 | Rossi | H04L 9/3239 |

FOREIGN PATENT DOCUMENTS

| | | |
|---|---|---|
| CN | 111371561 A | 7/2020 |
| CN | 112165472 A | 1/2021 |
| CN | 112383550 A | 2/2021 |
| CN | 112910840 A | 6/2021 |

OTHER PUBLICATIONS

Liang Zhu, et al., BBS: Micro-architecture Benchmarking Blockchain Systems through Machine Learning and Fuzzy Set, 2020 IEEE International Symposium on High Performance Computer Architecture (HPCA), 2020, pp. 411-423.

Zhang Jian-Wei, et al., PECDS: Potential Energy Based Caching Decision Strategy for Content-centric Network, Journal of Chinese Computer Systems, 2019, pp. 966-971, vol. 40, No. 5.

Shuichi Tokunaga, et al., A Content Registration Method for CCN Routers with Blockchain, 2020 IEEE International Conference on Consumer Electronics—Taiwan (ICCE—Taiwan), 2020.

Taeho Jung, et al., Privacy Preserving Cloud Data Access With Multi-Authorities, 2013 Proceedings IEEE INFOCOM, 2013, pp. 2625-2633.

Brent Waters, Ciphertext-Policy Attribute-Based Encryption: An Expressive, Efficient, and Provably Secure Realization, pp. 1-29.

Junzuo Lai, et al., Expressive CP-ABE with Partially Hidden Access Structures, ASIACCS, 2012.

Zhiwei Wang, et al., CP-ABE with Hidden Policy from Waters Efficient Construction, International Journal of Distributed Sensor Networks, 2015, pp. 1-8.

Matthew Green, et al., Outsourcing the Decryption of ABE Ciphertexts.

Jun Feng, et al., MOR-tree: An Access Structure for Multi-levels of Road Networks on Distributed Environment*, Transactions of the Institute of Systems, Control and Information Engineers, 2003, pp. 655-661, vol. 16, No. 12.

Tong Jin, et al., BlockNDN:A Bitcoin Blockchain Decentralized System over Named Data Networking, International Conference on Ubiquitous and Future Networks, 2017, pp. 75-80.

* cited by examiner

BLOCKCHAIN-BASED PRIVACY PROTECTION METHOD FOR CONTENT CENTRIC NETWORK (CCN)

CROSS REFERENCE TO THE RELATED APPLICATIONS

This application is based upon and claims priority to Chinese Patent Application No. 202110788755.2, filed on Jul. 13, 2021, the entire contents of which are incorporated herein by reference.

TECHNICAL FIELD

The present disclosure relates to the technical field of privacy protection, in particular, to a blockchain-based privacy protection method for a content centric network (CCN).

BACKGROUND

A traditional privacy protection solution for a CCN usually relies on a third party to control access to content. However, if there is a problem with a database of the third party, data privacy and security problems are caused. A blockchain technology can be used to reduce data privacy and security problems caused by an untrusted third party and create a trusted and neutral environment for the CCN. Different content can be stored on a blockchain in a same data format to implement secure sharing of the content.

Ciphertext-policy attribute-based encryption (CP-ABE) is a complex encryption technology for one-to-many data sharing and fine-grained access control and is an important means of privacy protection in a CCN. In a CP-ABE solution, each ciphertext is encrypted by using an access control policy formulated by a publisher, and private keys of consumers are associated with their own attributes. The consumer can decrypt the ciphertext only if the attribute of the consumer satisfies the access control policy. A designer usually entrusts content encrypted by using an access policy to a third party, such as a cloud service provider (CSP), and enables consumers to obtain keys from the third party through a set of attributes and decrypt encrypted data from the CSP. This process makes better use of the advantages of CP-ABE, allows a system to perform privacy protection on content in a unified and convenient manner, and reduces configuration, deployment, and management costs. Although the efficiency of obtaining content by the consumers is greatly improved, security and reliability heavily rely on a third party, such as the CSP. In addition, academia assumes that the third party is semi-trusted or trusted, which is unrealistic in reality. There are still problems such as high costs of establishing trust and single points of failure during implementation. Especially in the context of the CCN, balancing efficiency and security problems brought by a third party becomes increasingly prominent. Jung et al. proposed a multi-attribute encryption solution in which attributes are managed by different attribute authorities to resolve single-database failures. Waters et al. first proposed a policy-hiding CP-ABE solution based on a linear secret-sharing scheme (LSSS). Third-party servers cannot obtain access policies through ciphertext. However, this solution does not implement attribute revocation and fundamentally resist collusion attacks. Lai et al. proposed a hidden and revocable encryption solution based on multi-authority attributes. However, this solution has high computational costs and a long content retrieval delay. He et al. enhanced execution efficiency of the solution of Lai et al., but publishers still need to convert access policies through attribute permissions before encryption. Green et al. proposed an outsourced decryption solution, in which keys of a user are classified into an attribute key and a decryption key. During decryption, main computational overheads are outsourced to a CSP. Although execution efficiency is improved, a third party is inevitably involved. Therefore, it is a difficult problem to study an attribute encryption solution that implements both security and efficiency.

To resolve these problems, industry and the academia have begun to propose the use of the blockchain technology as a trusted third party to resolve the reliability problem of content sharing over a CCN. The blockchain technology is decentralized infrastructure and a distributed computing paradigm gradually emerged with encrypted digital currencies, and data is stored on a blockchain. The blockchain features decentralization, openness, autonomy, and non-tampering. The blockchain can be used as a ledger to record transactions between two parties. Once the transactions are recorded, they cannot be tampered with. Therefore, the blockchain can be used to resolve the problems of the traditional CP-ABE solutions. An access control policy can be recorded on the blockchain to implement user self-authentication and cloud non-repudiation. In addition, a hash value of data can be recorded to resist data tampering attacks. Therefore, the blockchain-based CP-ABE solution makes it possible to securely and efficiently share data over the CCN. However, how to improve an access control method of CP-ABE has become an important means of blockchain-based privacy protection for the CCN and is also the most important research work of a new generation network in the field of privacy protection.

SUMMARY

In view of the technical problems of traditional privacy protection methods, for example, long-term trust problems, single points of failure, and privacy leakage due to participation of entities such as collusion, the present disclosure proposes a blockchain-based privacy protection method for a CCN. CP-ABE is used to implement one-to-many data sharing, and a blockchain is used to record data access policies to implement user self-authentication and non-repudiation of CSPs. In addition, considering computing power of CCN nodes, an effective certificate method is used, and data revocation is also supported.

To achieve the foregoing objectives, the present disclosure provides the following technical solution: A blockchain-based privacy protection method for a CCN includes the following steps:

(1) initialization: allocating, by a system, identifiers (IDs) aid to trusted attribute authorization centers (AACs); and executing, by the trusted AAC, an initialization algorithm by using a security parameter to generate common parameters and a master key;

(2) key generation: allocating, by the trusted AAC, a unique ID to each valid consumer and publisher, and generating a public key and a private key for each consumer and publisher; and randomly generating, by the trusted AAC, its own public key and private key;

(3) encryption: communicating, by the trusted AACs, with each other to jointly calculate a public key SPK, and broadcasting the public key; and generating ciphertext CT and uploading the ciphertext CT to a CSP;

(4) transaction on-chaining: packaging, by the consumer, the ciphertext CT with a hidden access policy into a storage transaction by using the private key of the consumer, and sending the storage transaction to high-level consortium blockchain miners (HCBMs); and broadcasting, by the consumer, the storage transaction to consortium blockchain miners (CBMs) of a consortium blockchain, and verifying, by the HCBMs, the validity of the storage transaction through a signature, and verifying the validity of the ciphertext CT through a check code; and (5) decryption: when the consumer wants to obtain content of interest, finding, by the consumer, transaction information of the content on the consortium blockchain, sending an interest packet based on the transaction information, and finding a corresponding CSP through a storage address in the transaction information to obtain ciphertext CT; generating, by the consortium blockchain, an access transaction based on access information of the consumer; receiving, by a cache router (CR) closest to the CSP, the ciphertext CT, and sending the ciphertext CT to the consumer in a form of a data packet; and locally decrypting, by the consumer, the ciphertext CT, and verifying correctness of the content on the consortium blockchain.

Step (1) may include: generating a bilinear parameter $\Phi=\{G_0,G_1,e\}$ by using a security parameter $\lambda$ and a bilinear parameter generator, where an order of a multiplicative group $G_0$ is p, and g represents a generator of the multiplicative group $G_0$, and selecting a bilinear pairing $e:G_0 \times G_0 \rightarrow G_1$ as a bilinear mapping; randomly selecting an integer $\alpha \in Z_p$ as the master key MSK; and calculating $h=g^\alpha$ and establishing the global parameters Params=$\{\Phi,h,H\}$, where $H:\{0,1\}^* \rightarrow G_0$ represents a hash function, * represents random selection, $Z_p$ represents an integer set, and h represents the calculated global parameter.

Step (2) may include:

allocating, by the trusted AAC, the unique ID uid to each valid consumer and publisher, randomly selecting an integer $t_{uid} \in Z_p$ as the private key $SK_{uid}=\{t_{uid}\}$ of the consumer or publisher, calculating $g^{1/t_{uid}\alpha}$ and $g^{1/t_{uid}}$ as the public key $PK_{uid}=\{g^{1/t_{uid}\alpha},g^{1/t_{uid}}\}$ of the consumer or publisher, and sending the private key and the public key to the consumer or the publisher, where g represents a generator, $\alpha$ represents the master key, and $Z_p$ represents the integer set; and randomly selecting, by the trusted AAC, an integer $r \in Z_p$ as its own private key $SK_{aid}=\{r\}$, and calculating a bilinear mapping $e(g,g)^{r_i}$ as its own public key $PK_{aid}=\{e(g,g)^r\}$.

Step (3) may include:

after the initialization, broadcasting, by the trusted AACs, bilinear pairings $e(g,g)^{t_i}$; and after receiving all bilinear pairings, calculating, by the trusted AACs, the public key $SPK=e(g,g)^r$, where r represents the private key $SK_{aid}$ of the trusted AAC;

randomly selecting n−1 integers $y_2 \ldots y_n$ for shared encryption; selecting a random vector $v=(s, y_2, y_3, \ldots, y_n)^T$, where s represents a secret index to be shared; and calculating an intermediate variable $\lambda_i=v \times M_i$, where $1 \leq i \leq l$, $M_i$ represents a row vector of an l×n matrix M, $\lambda_i$ represents an $i^{th}$ share obtained by dividing the secret index s, and v represents the random vector formed by an access control policy;

calculating an intermediate variable $w_i=M_iZ$, where Z represents a random integer; and calculating $C_0, C_1, C_2, C_3, C_4$, where $C_0=me(g,g)^{st}$, $C_1=h^s$, $C_2=H(e(g,g)^{ys})$, $C_3=h^{\lambda_i}$, $C_4=H(\beta(i))$, $C_0=me(g,g)^{st}$ represents multiplication of plaintext m and the bilinear pairing, st represents a randomly selected secret parameter, y represents a random vector, and $\beta(i)$ represents a row-specific attribute; and uploading, by the consumer, the ciphertext CT=$\{C_0, C_1, C_2, C_3, C_4\}$ to the CSP for storage.

Packaging the storage transaction may include: calculating a hash value CheckCode of the ciphertext by using a hash function $H:\{0,1\}^* \rightarrow G_0$, where CheckCode=H (CT); calculating a hash value MD=H(H(m),Address,$Sign_{BSK_{uid}}$, CheckCode) of the transaction, where m represents plaintext, and $Sign_{BSK_{uid}}$ represents a signature; generating a signature Sign=$Sign_{SK_{uid}}$(MD) for the hash value MD of the transaction by using the private key $SK_{uid}$ of the consumer, where $Sign_{SK_{uid}}$( ) represents signature calculation; and generating the storage transaction $Tx_{storage}$=(H(m),Address, Sign, CheckCode).

The HCBMs compare a hash value MD' of the received storage transaction $Tx_{storage}$ with the hash value of the transaction generated when the signature Sign is verified by using the public key $BPK_{uid}$ broadcast by the publisher to verify the validity of the storage transaction $Tx_{storage}$, which may include:

calculating the hash value MD'=H (T,Address,Sign, CheckCode) of the transaction by using the hash function, where T represents a timestamp;

verifying the signature Sign by using the public key $DPK_{uid}$ used by the consumer for signature to obtain the hash value MD=$Computer_{BPK_{uid}}$(Sign), where $Computer_{BPK_{uid}}$( ) represents the process of verifying the signature by using the public key $DPK_{uid}$; and if MD'=MD, obtaining an address of the ciphertext CT based on Address and calculating a hash value CheckCode'=H(CT) of the ciphertext CT; if CheckCode'=CheckCode, the verification succeeds; otherwise, the verification fails.

Generating the access transaction in step (5) may include:

calculating a hash value H($Content_{name}$) of a content name $Content_{name}$ by using the hash function; calculating the hash value MD=H (uid,$Address_{uid}$,Sign,H($Content_{name}$)) of the transaction; generating a signature Sign=$Sign_{SK_{uid}}$(MD) for the hash value MD by using the private key $SK_{uid}$ of the consumer; and generating the access transaction $Tx_{proof}$=(uid,$Address_{uid}$,Sign,H($Content_{name}$)).

Verifying the validity of the access transaction $Tx_{proof}$ through the signature may include: comparing, by the CBMs, a hash value MD' of the received access transaction $Tx_{proof}$ with a message digest MD generated when the signature Sign is verified by using the public key $BPK_{uid}$ broadcast by the publisher to verify the validity of the access transaction $Tx_{proof}$, which may include:

calculating the hash value MD'=H (uid,$Address_{uid}$,Sign, H($Content_{name}$)) of the transaction by using the hash function; verifying the signature Sign by using the public key $DPK_{uid}$ to obtain the hash value MD=$Computer_{BPK_{uid}}$(Sign); if MD'=MD, finding a hash value the hash value H'($Content_{name}$) of the content name in the interest packet based on the address $Address_{uid}$; if H($Content_{name}$)=H'($Content_{name}$), indicating that the verification succeeds; otherwise, indicating that the verification fails, where H' represents the hash function;

generating an access transaction $Tx_{access}$ by the consumer may include: if the access transaction $Tx_{proof}$ is valid, obtaining a time time when the access transaction $Tx_{access}$ is generated; and calculating a hash value MD=H (A,uid, $Address_{store}$,Sign,$BPK_{uid}$,time) of the access transaction, where A represents an ID of the access transaction; and generating a signature sign=$Sign_{BSK_{uid}}$(MD) for the hash value MD by using the public key $BPK_{uid}$ of the publisher; obtaining the access transaction $Tx_{access}$=(A,uid, $Address_{store}$,sign,$BPK_{uid}$,time); otherwise, returning a null value; where time represents the time when the access transaction $Tx_{access}$ is generated, and Sign is used to prove that the access transaction $Tx_{access}$ is sent by the consumer.

Decrypting the ciphertext by the consumer may include:

selecting, by the trusted AAC, a random number $a_i \in Z_p$ for an attribute $x_i$, where a consumer attribute set is $S=(x_1, x_2, x_3, \ldots, x_n)$, $1 < t < n$, $x_i$ represents an attribute of the consumer, and n represents a quantity of consumer attributes;

generating, by the trusted AAC, a key $$SK_{uid,aid} = \left\{ D_1 : g^{\frac{r_i+\alpha}{\alpha r_i}}, D_2 : \forall a_i \in S : g^{\frac{k}{r_i}} H(a_i)^{r_{a_i}}, D_3 : h^{r_{a_i}} \right\},$$

where k, α, and $r_{a_i}$ are calculated security parameters, and D1, D2, and D3 are key parameters;

after receiving the ciphertext CT, pre-calculating, by the consumer, the ciphertext CT as follows:

$$P_x = \prod_{x \in I} \left( \frac{e(D_2, C_3)}{e(D_3, C_4)} \right) = e(g, g)^{\frac{ks\alpha}{r_z}}$$

$$C_x = \prod_{z=1}^{k} \frac{e(C_1, D_1)}{P_x}$$

where I represents an access attribute, x represents the attribute of the consumer, s represents a secret value, $C_x$ represents a calculated value of the consumer attribute, and $P_x$ represents a pre-calculated value of the consumer attribute; and decrypting, by the consumer, the ciphertext by using the key $SK_{uid,aid}$, and calculating the plaintext as follows:

$$m = \frac{CT}{(C_4)^{SK_{uid,aid}}}$$

When obtaining the plaintext m, the consumer calculates a hash value of the plaintext m and forms a verification transaction on the consortium blockchain, which may include:

calculating the hash value H'(m) of the plaintext m by using the hash function $H:\{0,1\}^* \to G_0$; and finding a hash value H(m) of the plaintext in the storage transaction $Tx_{storage}$;

if H(m)=H'(m), Code=true; otherwise, Code=false;

obtaining a time time when the transaction is generated; and calculating a hash value MD=H(time,uid,H(m), $Tx_{storage}$,Sign,Code) of the transaction;

generating a signature $Sign=Sign_{SK_{uid}}(MD)$ for the hash value MD by using the private key $SK_{uid}$ of the consumer; and generating the verification transaction $Tx_{verify}$=(time, uid,H(m),$Tx_{storage}$,Sign,Code); and after the verification transaction $Tx_{verify}$ is generated, broadcasting the verification transaction $Tx_{verify}$ to the CBMs of the consortium blockchain for verification, which may include:

calculating a hash value MD'=H(time,uid,H(m),$Tx_{storage}$, Sign,Code) of the transaction by using the hash function;

verifying the signature Sign by using the public key $BSK_{uid}$ to obtain the hash value MD=Computer$_{BPK_{uid}}$(Sign); and if MD'=MD, indicating that the verification succeeds; otherwise, indicating that the verification fails.

Compared with the prior art, the present disclosure has the following beneficial effects:

(1) The present disclosure proposes the CP-ABE and blockchain-based privacy protection solution for content sharing to resolve the security and privacy problems caused by a server. The blockchain is used as a trusted third party to make the system environment trusted and neutral.

(2) The blockchain is designed for content access control to implement self-authentication of consumers and publishers and non-repudiation of CSPs and record behavior of nodes in a behavior ledger. In addition, the LSSS is used to hide sensitive information in an access policy and implement rapid consumer authentication.

(3) Security analysis shows that the present disclosure provides data confidentiality and resistance to attacks, such as collusion attacks and CSP attacks. The present disclosure is applied to the CCN to implement fine-grained access control with a short content retrieval delay.

The present disclosure uses the blockchain to implement distributed and trusted access control, record the behavior of the nodes in the behavior ledger, trace the entire process of content sharing, and locate a malicious node. In addition, to implement fine-grained access of the consumers to content, CP-ABE based on LSSS is used to implement one-to-many content sharing, hide policies, and achieve fast authentication and more flexible expression. Security analysis shows that the present disclosure provides confidentiality of content sharing and resistance to collusion attacks and CSP attacks. Experimental results show that the present disclosure implements distributed access control and ensures security of access policies, data non-tampering, and traceability.

BRIEF DESCRIPTION OF THE DRAWINGS

To describe the technical solutions in the embodiments of the present disclosure more clearly, the following briefly describes the accompanying drawings required for describing the embodiments. It will become apparent that the accompanying drawings in the following description show merely some embodiments of the present disclosure, and a person of ordinary skill in the art may still derive other drawings from these accompanying drawings without creative efforts.

FIG. 6A shows the content retrieval delay of a Lai solution, FIG. 6B shows the content retrieval delay of a Waters solution, FIG. 6C shows the content retrieval delay of a He solution, and FIG. 6D shows the content retrieval delay of the present disclosure.

DETAILED DESCRIPTION OF THE EMBODIMENTS

The technical solutions of the embodiments of the present disclosure are clearly and completely described below with reference to the accompanying drawings. It will become apparent that the described embodiments are merely some, rather than all, of the embodiments of the present disclosure. All other embodiments obtained by those of ordinary skill in the art based on the embodiments of the present disclosure without creative efforts shall fall within the protection scope of the present disclosure.

Figure 3:
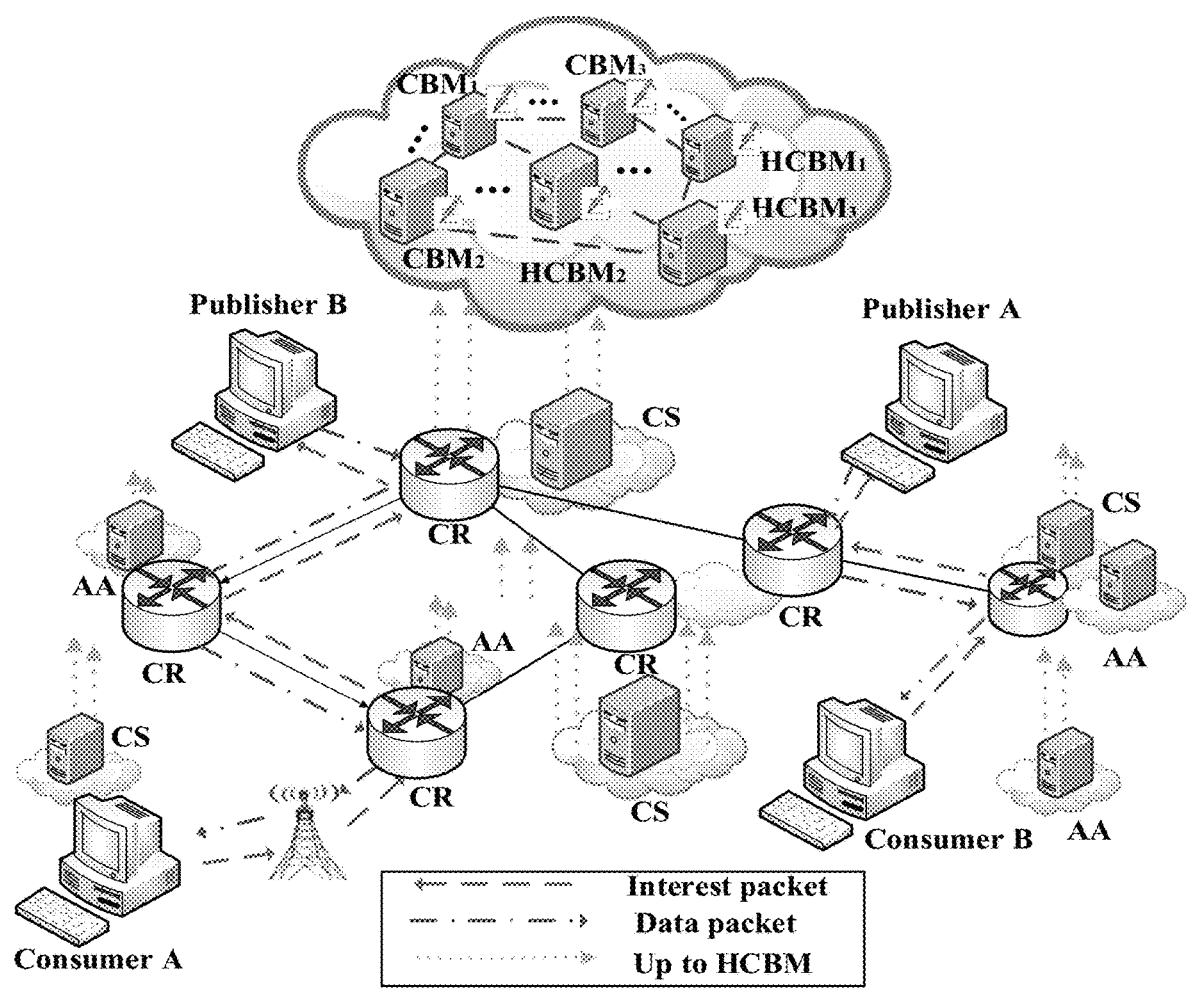
FIG. 3 is a model diagram according to the present disclosure.

As shown in FIG. 3, the present disclosure involves five types of entities: consumers, publishers, CSPs, CBMs, and trusted AACs. The CSP receives and stores ciphertext and then returns a signature for the ciphertext to the CBMs. The CSP is also responsible for providing data access services and storage services for the publishers. The CBMs need to verify whether the CSP correctly receives the ciphertext. If the value from the CSP is equal to a hash value of the ciphertext, the CBMs package an access control policy, the hash value of the data, and the signature of the CSP into a transaction. In the consortium blockchain of the present disclosure, the CBMs are classified into HCBMs and regular CBMs based on a transaction quantity and reputation. The reputation is indicated by working years and whether there is a record of malicious behavior. The regular CBMs can be promoted to HCBMs by improving their reputation and transaction quantities. All CBMs jointly maintain the blockchain. Only the HCBMs can interact with a CCN and generate new blocks.

The publishers are responsible for formulating access policies and encrypting data through CP-ABE. To improve system efficiency and implement trusted security access control, the consumers package transactions and send ciphertext addresses to the CBMs. In the present disclosure, the publishers include users and cache routers (CRs). The consumer is a data requester having a globally unique ID uid. Before accessing content, the user may verify whether an attribute of the user satisfies a corresponding access policy through the blockchain. After the ciphertext is decrypted, the user may verify that the data is not tampered with. The consumer can decrypt the ciphertext only if the attribute satisfies the access control policy. As a fully trusted attribute authority, the AAC is responsible for identifying consumers in its management domain and generating corresponding attribute keys. In addition, the AAC issues globally unique user IDs to the users and sends the user IDs to the CSPs. In the present disclosure, each AAC may manage a plurality of attributes, but each attribute can be managed by only one AAC. CS represents a server.

Figure 1:
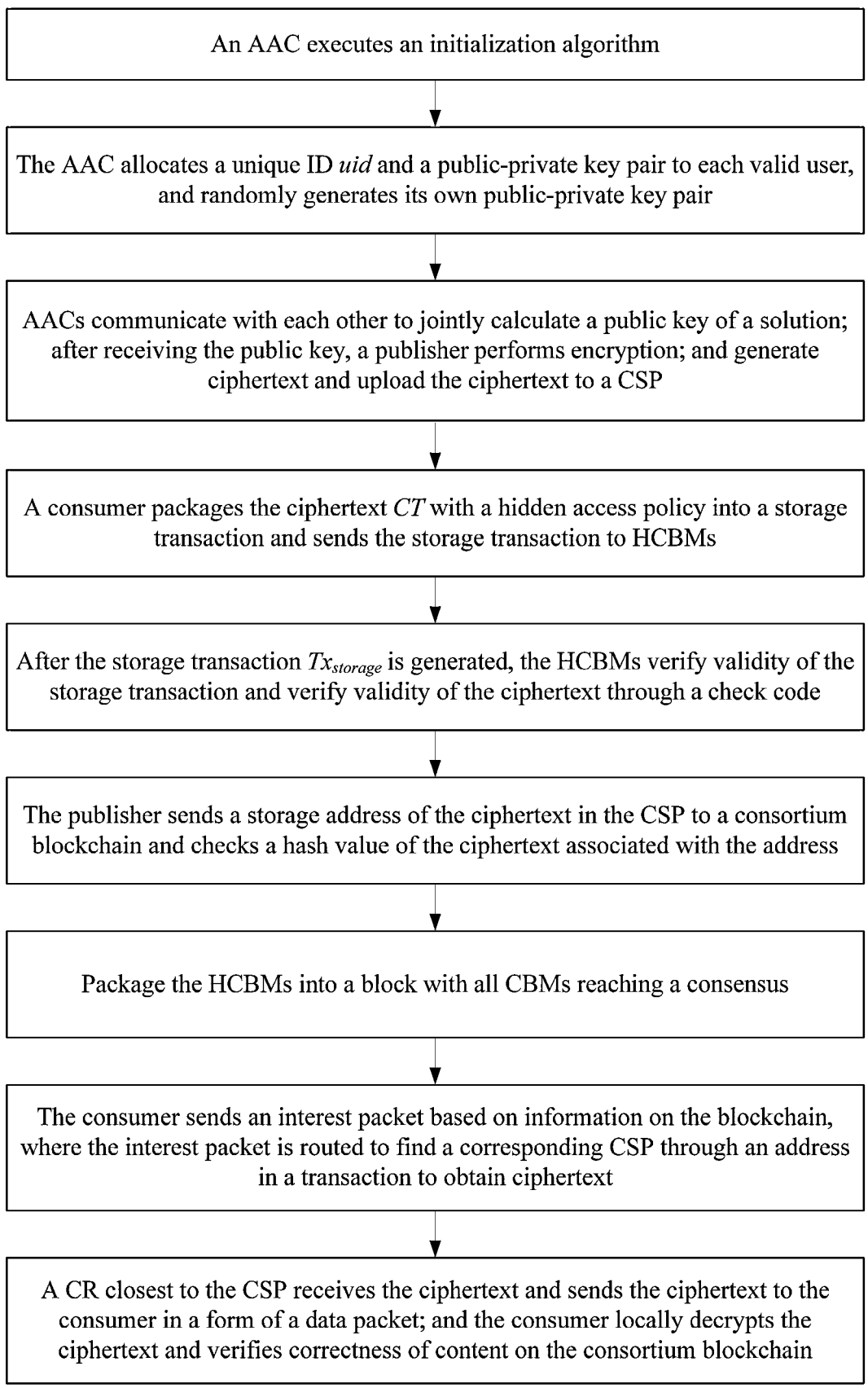
FIG. 1 is a flowchart according to the present disclosure.

A content sharing process in FIG. 3, including data transmission processes represented by three lines, is an entire content sharing process of the CCN shown in FIG. 1. There are two types of content: interest packets and data packets. The dashed line represents the transmission process of the interest packet, and the breakpoint line represents the transmission process of the data packet. The consumer first sends an interest packet to request data. The interest packet contains a name of the desired content to facilitate finding the data. When the interest packet arrives at a node that owns the requested data, the node returns a data packet carrying a related name prefix, data content, and publisher's signature. A passed path is left when the interest packet is forwarded, and the data packet is returned to the original consumer along the path. Neither the interest packet nor the data packet carries any host address or interface address. The interest packet finds the data provider through a routing mechanism of an interest data name, and the data packet finds the consumer through the record left by the interest packet at each node. The dotted line represents the process in which local users upload transactions to the blockchain for verification by HCBMs in the present disclosure.

As shown in FIG. 3, in the present disclosure, a calculation process is completed locally, and an execution process involves only the consumers, publishers, trusted AACs, and CBMs. The CSP is involved only in storing the ciphertext to balance an efficiency problem caused by a security mechanism. The present disclosure can provide not only distributed and trusted access control, but also protect privacy of access policies and attributes.

TABLE 1

Parameters in the present disclosure

| Parameter | Meaning |
| --- | --- |
| m | Content |
| $\lambda$ | Security parameter |
| e | Bilinear pairing e: $G_1 \times G_1 \to G_2$ |
| H | Hash function |
| $\Phi$ | Bilinear parameter generator |
| aid | AAC ID |
| (M, $\rho$) | Linear access structure |
| M | Secret sharing matrix: $l \times n$ |
| $\rho$ | Map each row $M_i$ to a corresponding attribute $\rho^{(i)}$ |
| uid | User ID |

Figure 2:
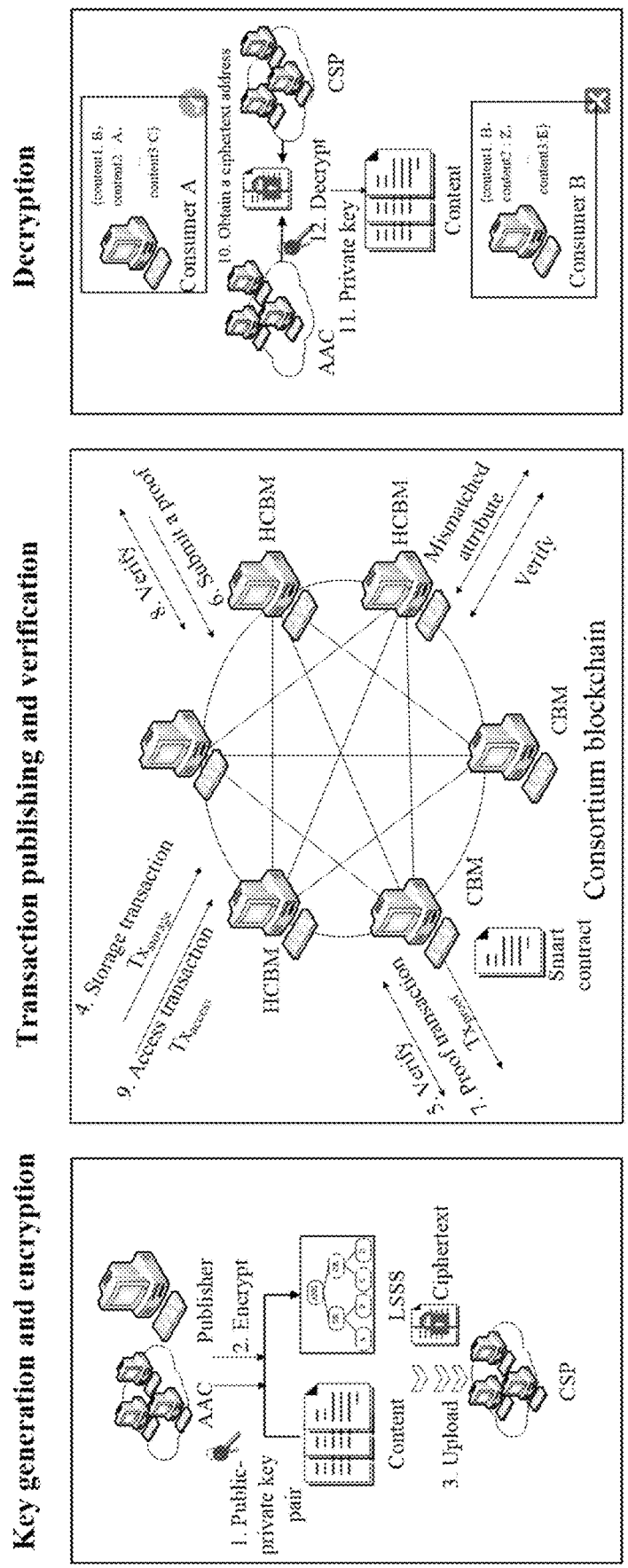
FIG. 2 is a principle diagram according to the present disclosure.

As shown in FIG. 1 and FIG. 2, a blockchain-based privacy protection method for a CCN includes five stages: initialization, key generation, encryption, transaction on-chaining, and decryption. The specific steps are as follows:

(1) Initialization: A system allocates IDs aid to trusted AACs, and the trusted AAC executes an initialization algorithm by using a security parameter to generate common parameters and a master key;

At this stage, the system allocates a globally unique ID aid to the trusted AAC, which means that the trusted AAC has valid execution power to initialize a solution. The AAC executes the initialization algorithm by using the security parameter $\lambda$ as input and running a bilinear parameter generator to generate the common parameters Params and the master key MSK.

[$AAC_{aid}$]: Init ($\lambda$, aid, $\Phi$ → (MSK, Params)

Input: aid, $\lambda$, and $\Phi$
Output: MSK and Params
1. Generate a bilinear parameter $\Phi = \{G_0, G_1, e\}$ by using the bilinear parameter generator, where an order of a multiplicative group $G_0$ is p and g is a generator of the multiplicative group $G_0$; and select a bilinear pairing e:$G_0 \times G_0 \to G$, as a bilinear mapping.
2. Let H :$\{0,1\}^* G_0$ be a hash function, where * represents random selection.
3. Randomly select an integer $a \in Z_p$ as the master key MSK; and calculate $h = g^a$, where $Z_p$ represents an integer set and h represents the calculated global parameter.
4. Establish the global parameters Params =$\{\Phi, h, H\}$.

(2) Key generation: The trusted AAC allocates a unique ID to each valid consumer and publisher, generates a public key and a private key for each consumer and publisher, and randomly generates its own public key and private key.

At this stage, the trusted AAC allocates the unique ID uid to each valid consumer and publisher and then generates a decryption public-private key pair ($DSK_{uid}$, $DPK_{uid}$) for each consumer and publisher. Because each publisher and consumer have different unique IDs, they have different public-private key pairs. In addition, the AAC randomly generates its own public-private key pair ($PK_{aid}$, $SK_{aid}$). aid represents the ID of each AAC used to distinguish the public-private key pair generated by each AAC. A specific implementation method is as follows:

[AAC$_{aid}$]: ADKGen (a, uid) → (DSK$_{uid}$, DPK$_{uid}$) , AKGen (aid) → (SK$_{aid}$, PK$_{aid}$)

Input: master key a, uid, and aid
Output: DSK$_{uid}$, DPK$_{uid}$, PK$_{aid}$, and SK$_{aid}$
1. Randomly select an integer $t_{aid} \in Z_p$ as the private key SK$_{aid}$ = {$t_{aid}$} of the consumer or publisher.
2. Calculate $g^{1/t_{uid}\, a}$ and $g^{1/t_{uid}}$ as the public key PK$_{uid}$ = {$g^{1/t_{uid}\, a}$, $g^{1/t_{uid}}$} of the consumer or publisher and send the private key and the public key to the consumer or the publisher.
3. The trusted AAC randomly selects an integer $r \in Z_p$ as its own private key SKad = { }.
4. Calculate a bilinear mapping $e(g,g)^{ri}$ as its own public key PK$_{aid}$ ={$e(g,g)$'} .

(3) Encryption: The trusted AACs communicate with each other to jointly calculate a public key SPK and broadcast the public key, and ciphertext CT is generated and uploaded to a CSP.

At this stage, the trusted AACs communicate with each other to jointly calculate the public key SPK and broadcast the public key. After receiving the public key SPK, the publisher uses content and an access control policy (M,β) defined by the publisher as input, where M in (M,β) is an l×n matrix and p is responsible for mapping each row of the matrix M to a corresponding attribute. The publisher selects a secret index s. To hide the secret index s, the publisher randomly selects $y_2, y_3, \ldots, y_n \in Z_p$ to construct a random vector $\vec{v}=(s, y_2, y_3, \ldots, y_n)$.

Finally, the ciphertext CT is generated and uploaded to the CSP.

[AAC, publisher]: APKGen (r,aid) → (SPK), Encrypt ((M, β), m, SPK) → (CT)

Input: (M,β),m,r
Output: SPK and CT
1. After the initialization, the AACs broadcast their own public keys, namely, bilinear pairings $e(g,g)^{ri}$ that hide the private keys. After receiving all bilinear pairings, the AACs calculate the public key SPK = $e(g,g)^r$ , where r represents the private key SK$_{aid}$ of the trusted AAC.
2. Randomly select n-1 integers $y_2...y_n$ for shared encryption, where M is a l × n matrix.
3. Select a random vector $\vec{v} = (s, y_2, y_3,..., y_n)$ , where s represents a secret index to be shared.
4. Calculate an intermediate variable $\lambda_i = v \times M_i$ , where $1 \leq i \leq l$ , $M_i$ represents a row vector of the matrix M, $\lambda_i$ represents an $i^{th}$ share obtained by dividing the secret index s, and v represents the vector formed by the access control policy and composed of the secret index s to be shared.
5. Calculate an intermediate variable $w_i = M_i Z (1 \leq i \leq l)$ , where Z represents a random integer.
6. Calculate $C_0, C_1, C_2, C_3, C_4$ , where $C_0 = me(g,g)^{st}$ , $C_1 = h^s$ , $C_2 = H(e(g,g)^{ys})$ , $C_3 = h^{\lambda_i}$ , and $C_4 = H\{\beta(i)\}$ $C_0 = me(g,g)^{st}$ represents multiplication of plaintext and the bilinear pairing, m represents the content, st represents a randomly selected secret parameter, y represents a random vector, and β(i) represents a row-specific attribute.
7. The consumer uploads the ciphertext CT= { $C_0, C_1, C_2, C_3, C_4$ } to the CSP for storage.

(4) Transaction on-chaining: The consumer packages the ciphertext CT with a hidden access policy into a storage transaction by using the private key generated for the consumer and sends the storage transaction to HCBMs. The consumer broadcasts the storage transaction to CBMs of a consortium blockchain, and the HCBMs verify validity of the storage transaction through a signature and verify validity of the ciphertext CT through a check code.

To implement a fully trusted content sharing process, a trust problem caused by a third party is eliminated. At this stage, the consumer packages the ciphertext CT with the hidden access policy into the storage transaction and sends the storage transaction to the HCBMs.

---
[Publisher]: $\text{Gen}_{Tx_{storage}}$ (H(m), Address,Sign,CheckCode) → $Tx_{storage}$
---

Input: ID H(m) of the storage transaction, storage address Address of the ciphertext, private key $BSK_{uid}$ used by the consumer to generate a signature Sign Output: storage transaction $Tx_{storage}$ 1. Calculate a hash value CheckCode of the ciphertext by using the hash function H :{0,1}* → $G_0$, where $CheckCode = H\ (CT)$.
2. Calculate a hash value MD = H(H(m),Address,$\text{Sign}_{BSK_{uid}}$, CheckCode) of the transaction, where m represents the plaintext, and $\text{Sign}_{BSK_{uid}}$ represents a signature. Different private keys indicate different signatures.
3. Generate a signature Sign = $\text{Sign}_{SK_{uid}}$ (MD) for the hash value MD of the transaction by using the consumer's private key $SK_{uid}$, where $\text{Sign}_{SK_{uid}}$( ) represents a signature generated by using the consumer's private key $SK_{uid}$ to sign the hash value MD of the transaction.
4. Generate the storage transaction $Tx_{storage}$ = (H(m),Address,Sign,CheckCode).
---

After the storage transaction $Tx_{storage}$ is generated, the storage transaction is broadcast to the CBMs of the consortium blockchain for verification. The CBMs can verify the validity of the storage transaction through the signature and the validity of the ciphertext through the check code. Specifically, the CBMs compare the hash value MD' of the received storage transaction $Tx_{storage}$ with the hash value MD of the transaction generated when the signature Sign is verified by using the public key $BPK_{uid}$ broadcast by the publisher to verify the validity of the storage transaction $Tx_{storage}$.

---
[CBMs]: Verify(H(m),Address,Sign, CheckCode) → True / False
---

Input: $Tx_{storage}$=(H(m), Address,Sign,CheckCode) and public key $DPK_{uid}$ used by the consumer for signature Output: validity of $Tx_{storage}$ 1. Calculate the hash value MD' = H(T,Address,Sign,CheckCode) of the transaction by using the hash function, where T represents a timestamp.
2. Verify the signature Sign by using the public key $DPK_{uid}$ used by the consumer for signature to obtain the hash value MD=$\text{Computer}_{BPK_{uid}}$ (Sign) , where $\text{Computer}_{BPK_{uid}}$ ( ) represents the process of verifying the signature by using the public key DPKuid.
3. If MD' = MD :
4. Obtain the address of the ciphertext CT based on Address.
5. Calculate a hash value CheckCode' = H(CT) of the ciphertext CT.
6. If CheckCode' = CheckCode :
7. The verification succeeds.
8. Otherwise, the verification fails.
---

To reduce storage costs, the publisher in the present disclosure separately sends the CSP storage address of the ciphertext to the consortium blockchain. In addition, to ensure integrity of the ciphertext stored by the CSP, it is necessary to further check whether the ciphertext hash value CheckCode' related to the storage address Address of the ciphertext CT is equal to the hash value CheckCode of the storage transaction $Tx_{storage}$. Once verified, the HCBMs are packaged into a block, and all CBMs reach a consensus.

The HCBMs use the public key to verify the signature and obtain a value and a check code for character comparison. If the comparison is successful, the ciphertext is not tampered with, and the ciphertext is valid; otherwise, the ciphertext is invalid.

(5) Decryption: When the consumer wants to obtain content of interest, the consumer finds transaction information (similar to information about the content, such as a hash value of a content name) of the content on the consortium blockchain. The consumer sends an interest packet based on the transaction information on the consortium blockchain and finds a corresponding CSP through a storage address in the transaction information to obtain ciphertext CT. The consortium blockchain generates an access transaction based on access information of the consumer. A CR closest to the CSP receives the ciphertext CT and sends the ciphertext CT to the consumer in the form of a data packet. The consumer locally decrypts the ciphertext CT and verifies correctness of the content on the consortium blockchain.

When the consumer wants to obtain the content of interest, the consumer first finds the transaction information of the content on the consortium blockchain. Then, the consumer sends the interest packet, which is routed and forwarded to find the corresponding CSP through a storage address Address of the ciphertext in the transaction information to obtain the ciphertext. At the same time, the consortium blockchain generates the access transaction based on the access information of the consumer. Finally, the CR closest to the CSP receives the ciphertext and send the ciphertext to the consumer in the form of the data packet. The consumer locally decrypts the ciphertext and verifies the correctness of the content on the consortium blockchain. Specifically, the consumer locally maps each attribute of the consumer to a corresponding row of a matrix through the function p to obtain the attribute matrix M' of the consumer. If the rank of the calculated attribute matrix M' is equal to its order, the attribute of the consumer satisfies the access control policy. An access proof proof is added to the interest packet, and relevant information is packaged to form the access transaction and uploaded to the consortium blockchain. After checking the access transaction on the consortium blockchain, the CSP sends the ciphertext to the CR closest to the consumer based on the location of the consumer. The CR forms the data packet, which finally arrives to the consumer. The consumer uses the own private key to locally decrypt the ciphertext and compares the hash value of the content on the consortium blockchain to ensure integrity and confidentiality of the content during transmission.

[CBMs]: Gen$_{proof}$ (uid,Address$_{uid}$,Sign,H(Content$_{name}$)) Tx$_{proof}$ Input: the ID uid and address Address$_{uid}$ of the consumer and the consumer's private key BSK$_{uid}$ is used to generate the signature.
Output: Txp$_{roof}$
1. Calculate the hash value H (Content$_{name}$) of the content name Content$_{name}$ by using the hash function. Generally, the interest packet contains the content name Content$_{name}$.
2. Calculate the hash value MD = H(uid,Address$_{uid}$,Sign,H (Content$_{name}$)) of the transaction.
3. Generate a signature Sign = Sign$_{SK_{uid}}$ (MD) for the hash value MD through the consumer's private key SK$_{uid}$;
4. Generate the access transaction Tx$_{proof}$ = (uid,Address$_{uid}$,Sign,H(Content$_{name}$)).

After the access transaction Tx$_{proof}$ is generated, the access transaction is broadcast to the CBMs of the consortium blockchain for verification. The CBMs can verify the validity of the transaction through a signature. Specifically, the CBMs compare the hash value MD' of the received access transaction Tx$_{proof}$ with a message digest MD generated when the signature Sign is verified by using the public key BPK$_{uid}$ broadcast by the publisher to verify the validity of the access transaction Tx$_{proof}$.

[CBMs]: Verify(uid, Address$_{uid}$, Sign, H(Content$_{name}$)) → True / False

Input: Tx$_{proof}$ = (uid, Address$_{uid}$, Sign, H(Content$_{name}$)) and the public key DPK$_{uid}$ used by the consumer for signature
Output: validity of Tx$_{proof}$
1. Calculate the hash value MD' = H(uid,Address$_{uid}$,Sign,H(Content$_{name}$)) of the transaction by using the hash function.
2. Verify the signature Sign by using the public key DPK$_{uid}$ to obtain the hash value MD=Computer$_{BPK_{uid}}$ (Sign).
3. If MD' = MD :
4. Find the hash value H'(Content$_{name}$) of the content name in the interest packet based on the address Address$_{uid}$, where H' represents a hash function.
6. If H (Content$_{name}$) = H'(Content$_{name}$):
7. The verification succeeds.
8. Otherwise, the verification fails.

After this, the consumer generates a valid access transaction Tx$_{access}$, and a smart contract also verifies access permissions. A represents an ID of the access transaction, time represents the time when the access transaction Tx$_{access}$ is generated, and Sign is used to prove that the access transaction Tx$_{access}$ is sent by the consumer.

[Consumer]: Gen$_{access}$ (A,uid,Address$_{store}$,sign,BPK$_{uid}$,time) Tx$_{access}$ Input: the ID A of the access transaction and Tx$_{proof}$ = (uid,Address$_{uid}$,Sign,H(Content$_{name}$))
Output: the access transaction Tx$_{access}$
1. If the access transaction Tx$_{proof}$ is valid:
2. Obtain the time time when the transaction is generated.
3. Calculate the hash value MD = H(A,uid,Address$_{store}$,Sign,BPK$_{uid}$,time) of the access transaction.
4. Generate a signature sign = Sign$_{BSK_{uid}}$ (MD) for the hash value MD by using BPK$_{uid}$ , where DPK$_{uid}$ represents the public key of the consumer.
5. Obtain the access transaction Tx$_{access}$ (A,uid,Address$_{store}$,sign,BPK$_{uid}$,time).
6. Return the access transaction Tx$_{access}$.
7. Otherwise, return a null value.

The CBM on the blockchain authorizes the AAC to generate the private key SK$_{uid,aid}$ and send the private key to the consumer who obtains access permissions. After checking the access transaction on the consortium blockchain, the CSP sends the ciphertext to the CR closest to the consumer based on the location of the consumer. The CR forms the data packet, which finally arrives to the consumer. The consumer locally decrypts the ciphertext by using the private key SK$_{uid,aid}$ and the private key SK$_{uid}$.

[AAC and consumer]: SKGen (S, uid, $SK_{uid}$) → $SK_{uid,aid}$, Decrypt (CT, uid, $SK_{uid}$) → $SK_{uid,aid}$ Input: consumer attribute set S, user ID uid, ciphertext CT, and user decryption key ($SK_{uid}$)
Output: $SK_{uid,aid}$ and m
1. The AAC inputs the user decryption key $SK_{uid}$ and the consumer attribute set $S = (x_1, x_2, x_3, \ldots, x_n)$.
2. The AAC selects a random number $a_i \in Z_p$ for an attribute $x_t (1 < t < n)$, where $x_i$ represents an attribute of the consumer, and n represents a quantity of consumer attributes;

3. The AAC generates a key $SK_{uid,aid} = \left\{ D_1:g^{\frac{r_i+\alpha}{\alpha r_i}}, D_2: \forall\, a_i \in S: g^{\frac{k}{r_i}} H(a_i)^{r_{a_i}}, D_3:h^{r_{a_i}} \right\}$, where k, $\alpha$, and $r_{a_i}$ are calculated security parameters, and D1, D2, and D3 are key parameters.
4. After receiving the ciphertext CT, the consumer pre-calculates the ciphertext CT as follows:

$$P_x = \prod_{x \in I} \left( \frac{e(D_2, C_3)}{e(D_3, C_4)} \right) = e(g, g)^{\frac{ks\alpha}{rz}}$$, where I represents an access attribute, x represents $$C_x = \prod_{z=1}^{k} \frac{e(C_1, D_1)}{P_x}$$

the attribute of the consumer, s represents a secret value, $C_x$ represents a calculated value of the consumer attribute, and $P_x$ represents a pre-calculated value of the consumer attribute.
5. The consumer decrypts the ciphertext by using the private key $SK_{uid}$ of the consumer and calculates plaintext as follows:

$$m = \frac{CT}{(C_4)^{SK_{uid,aid}}}$$, where the private key of the consumer with the user ID *uid* is used.

When obtaining the content, namely, the plaintext m, the consumer needs to calculate a hash value of the plaintext m and form a verification transaction on the consortium blockchain to prove whether the hash value is equal to H(m). If no, Code=false is displayed on the consortium blockchain, indicating that the plaintext m is not the original uploaded data, and the CSP needs to update the ciphertext. If yes, Code=true is displayed on the consortium blockchain, indicating that the content m is correct.

[Consumer]: $Gen_{verify}$(time,uid,H(m),Sign,Code) → $Tx_{verify}$

Input: the user ID uid, the hash value H(m) of the plaintext, and the storage transaction $Tx_{storage}$
Output: the verification transaction $Tx_{verify}$
1. Calculate the hash value H'(m) of the content m by using the hash function H : $\{0,1\}^* \to G_0$.
2. Find the hash value H(m) of the content in the storage transaction $Tx_{storage}$.

[Consumer]: $Gen_{verify}$(time,uid,H(m),Sign,Code) → $Tx_{verify}$

3. If H(m) = H'(m)
  Code=true.
  Otherwise, Code=false.
4. Obtain the time time when the transaction is generated.
5. Calculate the hash value MD = H(time,uid,H(m),$Tx_{storage}$,Sign, Code) of the transaction.
6. Generate a signature Sign = $Sign_{SK_{uid}}$ (MD) for the hash value MD through the consumer's private key $SK_{uid}$;
7. Generate the verification transaction $Tx_{verify}$ = (time,uid,H(m), $Tx_{storage}$,Sign,Code).

After the verification transaction $Tx_{verify}$ is generated, the verification transaction $Tx_{verify}$ is broadcast to the CBMs of the consortium blockchain for verification. The verification is in the same manner as the foregoing transaction verification. The HCBMs package and publish the transaction on the consortium blockchain.

[CBMs]: Verify(time,uid,H(m),$Tx_{storage}$,Sign,Code) → True / False

Input: $Tx_{verify}$ = (time,uid,H(m),$Tx_{storage}$,Sign,Code) and the public key $BSK_{uid}$ used by the
consumer for signature
  Output: validity of the verification transaction $Tx_{verify}$
  1. Calculate the hash value MD' = H(time,uid,H(m),$Tx_{storage}$,Sign,Code) of the transaction
by using the hash function.
  2. Verify the signature Sign by using the public key $BSK_{uid}$ to obtain the hash value MD=$Computer_{BPK_{uid}}$ (Sign)
  3. If MD' = MD :
  4. The verification succeeds.
  5. Otherwise, the verification fails.

In the solution of the present disclosure, the practical Byzantine fault tolerance (PBFT) protocol is used to maintain the blockchain. A specific process is shown in FIG. 3. The smart contract is described as follows:

(1) The CBMs are classified into HCBMs and regular CBMs based on transaction quantity and reputation. The reputation is indicated by working years and whether there is a record of malicious behavior. The regular CBMs can be promoted to HCBMs by improving their reputation and transaction quantities. All CBMs jointly maintain the blockchain. Only the HCBMs can interact with the CCN and generate new blocks.

(2) Serial number allocation: Both the consumers and CBMs can upload data to the consortium blockchain and then broadcast their own generated transactions to the entire network. In addition, the HCBMs collect and sort the transactions, put them into a list, and broadcast the list to the network.

(3) Interaction: When receiving the transaction list, the CBM verifies the transactions based on orders. After the CBMs verify all transactions, the HCBMs calculate a hash value of a new block based on the transactions, and then broadcast the value to the network. In this process, each CBM must verify whether there is a signature in the transaction to verify whether the transaction is valid.

(4) Serial number confirmation: When receiving 2f+1 commit messages (including its own commit messages), the CBM packages all transactions into a new block and records the block on the local blockchain. The HCBMs are responsible for generating a new block.

Confidentiality and reliability of content sharing: To implement trusted and secure content sharing over the CCN, most of the existing work requires an intermediate entity for access control. This inevitably leads to problems, such as high trust establishment costs, single points of failure, and privacy leakage. The present disclosure resolves these problems through the blockchain featuring distributed storage, decentralization, transparency, and non-tampering. The hash value of data is recorded on the blockchain. The generated ciphertext with a hidden access policy and address are sent to the blockchain. Reliability of content sharing can be ensured without involving any intermediary entity. The CSP is responsible only for storage. During authorization by the consortium blockchain, each consumer's proof is verified through a predefined smart contract that achieves trusted authorization with little manual intervention. In addition, the reliability of the content in the present disclosure is ensured based on the LSSS-based policy-hiding CP-ABE solution, which is secure for publishers. The CSPs decrypt the ciphertext by using their attribute keys only if the consumer's attributes satisfy the access control policy. The consumer's decryption key is issued by the AAC, and the AAC is distributed and fully trusted. Therefore, the present disclosure combined with the blockchain and attribute encryption is trusted in serving data sharing.

Privacy: Most of the existing work directly stores access policies or attribute sets on the blockchain, which poses a great threat to privacy leakage. To protect privacy, necessary hiding processing is required. In terms of access policy privacy, CP-ABE can hide access policies through vector representation. The present disclosure can provide not only fine-grained access control, but also store data in an encrypted form, such that eavesdroppers cannot obtain sensitive data. In this way, privacy protection can be implemented in the transparent and distributed environment of the blockchain.

Integrity: To increase scalability of the system, ciphertext addresses are stored on the blockchain. However, the ciphertext associated with the ciphertext addresses may be changed by the CSP. To ensure that the consumers can obtain complete content, an integrity check code of the ciphertext is added to the storage transaction, and the ciphertext can be verified at any time to ensure the integrity of the content.

Traceability: Access control information on the blockchain can be tracked and verified. Any authorization is recorded as an immutable access transaction, such that the publisher knows which consumer accesses the content stored in the CSP, and no consumer can deny an access operation. In addition, the storage transaction makes it impossible for the publisher to refuse not to provide data. The consumer can detect malicious attempts of other consumers through verification.

Anti-jamming and hijacking attacks: When an attacker pretends to be a valid consumer and transmits an unnecessary or malicious content request, the attacker first must send an interest packet to a local CR of the attacker and submit a fake access transaction $Tx_{proof}$ to the consortium blockchain. Then, the blockchain verifies the validity of the address and discovery message. If the address and discovery message are invalid, the unnecessary or malicious content request is canceled to prevent an interference attack. For hijacking attacks, the present disclosure can help locate malicious CCN nodes. Specifically, when a malicious CCN node declares any content as an invalid path of a publisher, the present disclosure can help mine the ciphertext storage transaction $Tx_{storage}$ recorded on the consortium blockchain. As the publisher, the malicious CCN node can be tracked based on the storage transaction $Tx_{storage}$ and a publisher ID recorded in the AAC.

Resistance to collusion and collusion attacks: Sometimes, motivated by profit, invalid users may collude with each other to decrypt ciphertext. It is assumed that a consumer defines an access control policy $(A)\wedge(B\vee C)$. Only users with (AB) or (AC) attributes can access the data. A user 1 has an attribute A, and a user 2 has attributes B and C. A and B cannot decrypt the ciphertext alone. However, if A and B collude with each other, both have the attributes that satisfy the access control policy. In the present disclosure, each user's decryption key corresponds to the user's unique ID. The AAC does not generate keys for different user IDs. Therefore, the present disclosure can resist the collusion between users.

In another case, the CSP colludes with an invalid user to conduct a collusion attack to obtain the ciphertext. However, they do not have the corresponding decryption key, and they still cannot restore the data. Therefore, the present disclosure can also resist the collusion between the CSP and the user.

Resistance to CSP attacks: In the existing CP-ABE solutions, the CSP is considered to be semi-trusted, which means that the CSP strictly follows the solution of the present disclosure but may pose threats to the content. However, in practice, some CSPs may tamper with data or deny the access of valid users to data, which is not considered in the existing CP-ABE solutions. In the solution of the present disclosure, the blockchain is used to record the hash values of the content and the ciphertext. When obtaining the content m, the consumer needs to calculate the hash value of the content m and form a verification transaction on the consortium blockchain to prove whether the hash value is equal to H(m). If no, Code=false is displayed on the consortium blockchain, indicating that the content m is not original uploaded data. The consumer can send an error report to the CSP, and the CSP updates the ciphertext. If yes, Code=true is displayed on the consortium blockchain, indicating that the content m is correct. Therefore, the present disclosure can resist data tampering by the CSP.

The present disclosure mainly compares the present disclosure and other related blockchain-based privacy protection methods in terms of computational complexity, communication consumption, and functionality. In terms of computational complexity, because most of the time-consuming operations in the present disclosure are bilinear pairing operations and exponential operations on a group, only the length of the ciphertext and the time for decryption are analyzed for these two types of operations. In terms of communication consumption, the public key, master key, private key, and ciphertext length are mainly analyzed. In terms of functionality, encrypted data storage, fine-grained access control, and privacy of access policies and user attributes are analyzed for the present disclosure.

Computational overheads come from time complexity of calculation. As shown in table 2, a calculation amount of the present disclosure is compared with calculation amounts of other methods. N represents a quantity of system attributes, n represents a quantity of user attributes, p represents the time taken for the bilinear pairing operation, e represents the time taken for the exponential operation on the group, and $|I|$ represents a quantity of attributes in the decryption key that satisfy a ciphertext access structure.

TABLE 2

Computational complexity comparison

| Solution | Initialization | Key generation | Encryption | Decryption |
|---|---|---|---|---|
| Lai | $2e + p$ | $(2n + 3)e$ | $(6l + 4)e + 2p$ | $(2|I| + 1)p + |I|e$ |
| Waters | $3e + p$ | $3e$ | $(3l + 2)e + p$ | $(2|I| + 1)p + (2|I| + 1)e$ |
| He | $(N + 3)e + p$ | $3e$ | $(3l + 4)e + 2p$ | $(2|I| + 2)p + (2|I| + 4)e$ |
| The present disclosure | $(N + 3)e + p$ | $(n + 3)e$ | $(3l + 2)e + p$ | $(2|I| + 1)p + |I|e$ |

As shown in table 2, during the system initialization, because the access policy is hidden in both the present disclosure and the He solution, N attributes need to be processed first, and there are N additional exponential operations. During the encryption and key generation, the advantage of the present disclosure is that the exponential time is half that of the Lai solution and is less than that of the He solution. The quantities of bilinear pairing operations in the other three solutions are similar. In the Waters solution, the time of the initialization has nothing to do with the quantity of attributes. During the encryption, there are multiplication or point multiplication operations, which can be ignored. Therefore, policy hiding of the present disclosure does not involve too many bilinear pairing operations. In addition, the decryption time of the present disclosure is less than that of the Waters solution. Overall, the present disclosure does not sacrifice execution efficiency to improve security.

The communication overheads are associated with a message length. $|G_{p0}|$ represents a length of a group element $G_{p0}$, and $|G_{p1}|$ represents a length of a group element $G_{p1}$. PK represents the public key, and SK represents the private key.

TABLE 3

Communication overhead comparison

| | Communication overheads | | | |
|---|---|---|---|---|
| Solution | PK | SK | MSK | CT |
| Lai | $(3 + n)|G_{P0}| + 2|G_{P1}|$ | $|G_{P1}| + |G_{P2}|$ | $|G_{P1}| + |G_{P2}|$ | $(6l + 2)|G_{P0}| + (4l)|G_{P1}|$ |
| Waters | $(1 + N)|G_{P1}|$ | $2|G_{P0}|$ | $|G_{P0}|$ | $(2l + 1)|G_{P0}|$ |
| He | $(2 + N)|G_{P0}| + (1 + N)|G_{P1}|$ | $2|P_{P0}|$ | $|G_{P0}|$ | $(2l + 2)|G_{P0}| + 1|G_{P1}|$ |
| The present disclosure | $(2 + N)|G_{P0}| + (1 + N)|G_{P1}|$ | $|G_{P0}|$ | $2|G_{P0}|$ | $(3l + 1)|G_{P0}| + (3l)|G_{P1}|$ |

As shown in Table 3, the communication overheads of the present disclosure and the He solution are not much different. Although the communication overhead of the present disclosure is less than that of the He solution by the size of one group G element in terms of the size of the public key, the gap can almost be made up because the length of one group G element is added when the master key MSK is generated in the present disclosure. Compared with the other solutions, the present disclosure increases the length of the public key but reduces the length of the ciphertext by half. Overall, the present disclosure increases some system storage space.

Table 4 shows functional comparison results. Blockchain represents whether a blockchain is used to assist access control, AAC represents whether a multi-attribute authorization center is used, Traceability represents whether data is traceable, and Full Secure represents whether a mathematical problem is involved. Compared with the other solutions, the present disclosure uses an LSSS access structure that is more flexible and more in line with practical application scenarios, reduces computational and storage burdens of authorities and publishers, and supports traceability. In addition, only the present disclosure uses excellent features of the blockchain to send an address of the ciphertext with a hidden access policy to the consortium blockchain, which proves the reliability of combining CP-ABE with the features of the blockchain to control access in the CCN.

TABLE 4

Functionality comparison

| Solution | Policy hiding | Blockchain | AAC | Traceability | Full Secure |
|---|---|---|---|---|---|
| Lai | ✓ | x | x | x | x |
| Waters | x | x | x | x | x |
| He | ✓ | x | ✓ | x | ✓ |
| The present disclosure | ✓ | ✓ | ✓ | ✓ | ✓ |

To verify the performance of the present disclosure, a ccnSim module in ns-3 is used to simulate the CCN, and the consortium blockchain is mainly implemented by calling an interface of BlockNDN (a framework for calling the blockchain). Evaluation indicators include network performance and a privacy protection effect. The network performance is indicated by a cache hit rate and an average content retrieval delay. The privacy protection effect is indicated by a risk of cache privacy. Finally, superiority of the solution of the present disclosure is verified by comparing and analyzing simulation results with the other solutions.

Figure 4:
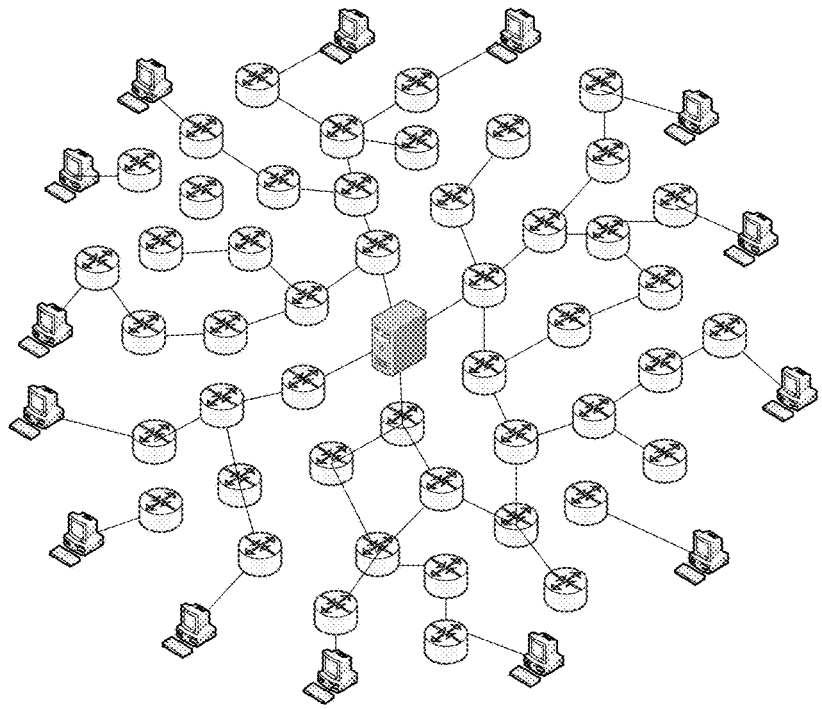
FIG. 4 is a simulated network topology according to the present disclosure.

In the simulation experiment, the hardware environment is Intel® Core™ 7-9700 CPU with 300 GHz and 32 GB of memory, and the operating system is Ubuntu 20.10. The ccnSim module uses C++ to write a CCN simulator, which can simulate basic functions of the CCN. The network topology shown in FIG. 4 is used in the experiment. There are 30 CRs that have the same cache size. A maximum quantity is 50. The link bandwidth between the CRs is 20 Mbps, and the delay is 1 ms. The network is provided with 4 content origin servers as consumers, responsible for publishing content and packaging and sending transactions to the consortium blockchain. The cache of each CR is empty initially. A default caching mode is least recently used (LRU), and a ubiquitous cache is used. The running time is set to 50 s, and sampling and analysis is performed every 5 s. There are 15 consumers, and a request probability obeys a Zipf distribution. The user's request obeys the Zipf distribution, and $\alpha=1$. Each user sends 10/s content requests within a specific period. Specific parameters are shown in table 5.

TABLE 5

Simulation parameters

| Main parameters | Meaning |
| --- | --- |
| N | Quantity of content on the content origin servers |
| M | Quantity of chunks contained in the content |
| CS | Router cache space |
| R | Quantity of routers in the network topology |
| $\alpha$ | Zipf distribution parameter |
| DS | Cache decision method |

Figure 5:
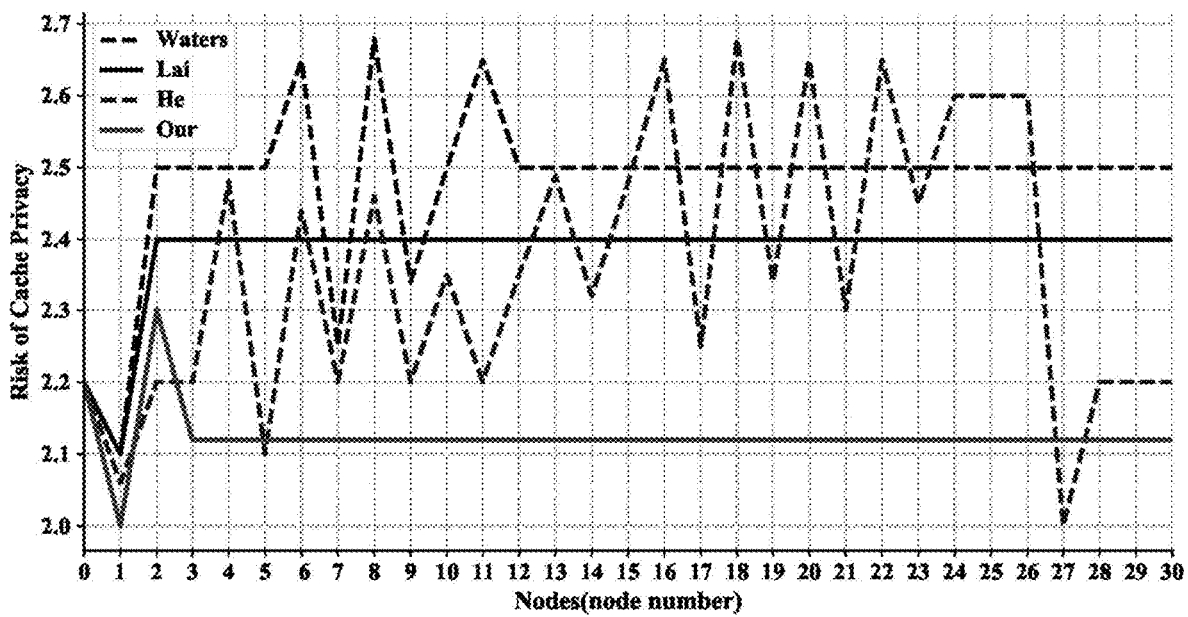
FIG. 5 is a schematic diagram of comparison between risks of cache privacy of the present disclosure and comparative solutions.
Figure 6A:
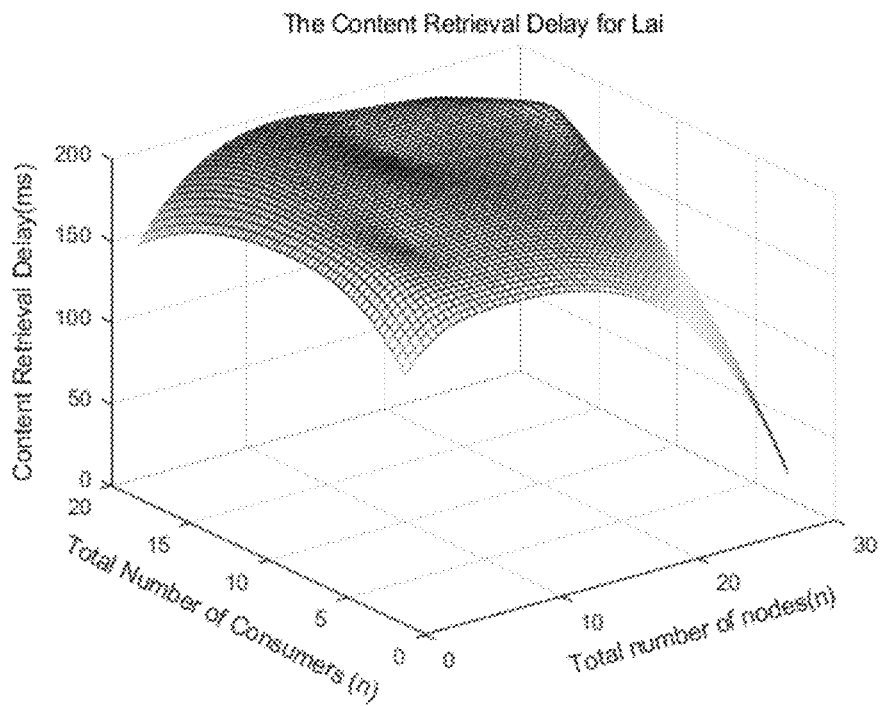
FIGS. 6A-6D are schematic diagrams showing comparison between content retrieval delays of the present disclosure and comparative solutions, where
Figure 6B:
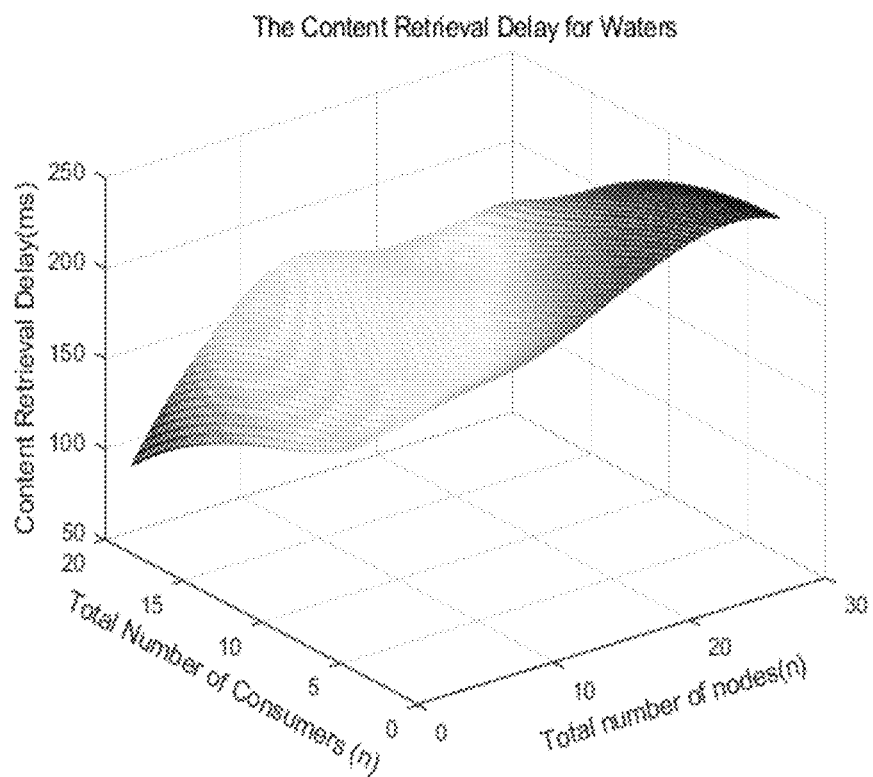
Figure 6C:
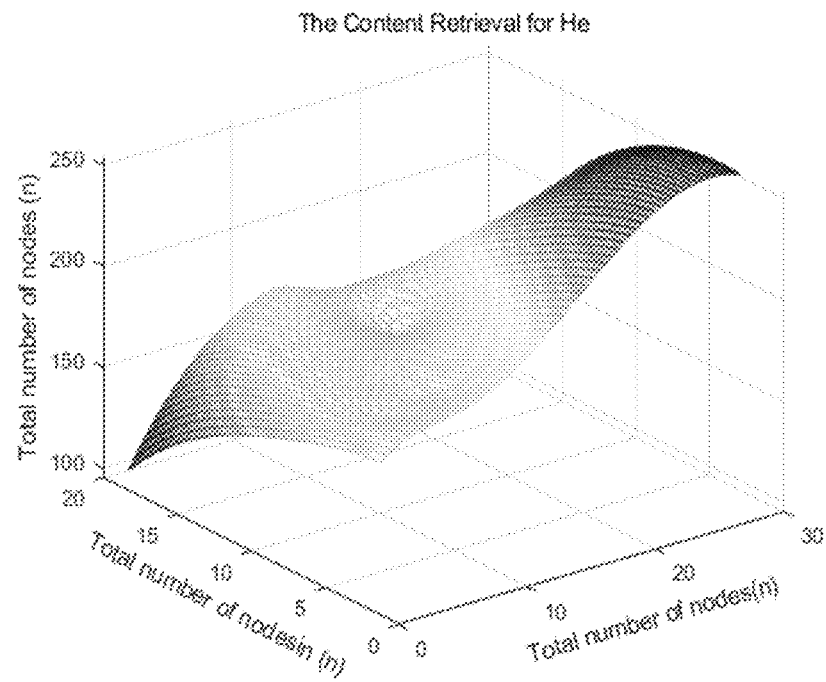
Figure 6D:
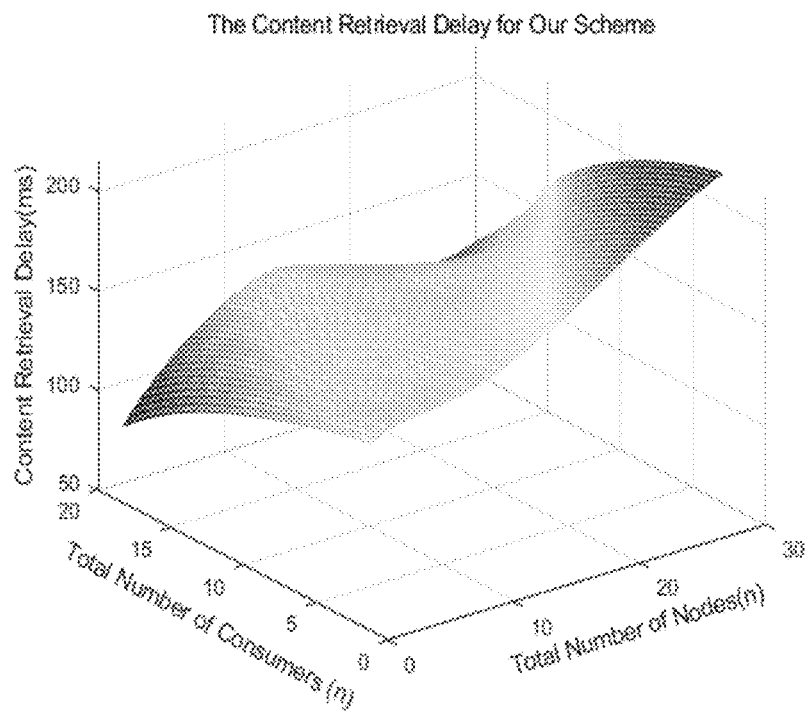

Analysis of the Risks of Cache Privacy:

In this experiment, it is assumed that an adversary's attack frequency is the same as a consumer's request frequency, which is 10 times per second. According to the calculation method defined by Waters, as shown in FIG. 5, in an initial stage of the experiment, changes of the risks of cache privacy of all solutions are very close. However, with the continuous increase of nodes and cache content in the simulation experiment, the adversary utilizes the point that Waters uses a third party to control access and can easily launch hijacking attacks and third-party attacks. Therefore, the risk of cache privacy remains high, and the highest risk of cache privacy can reach 2.65. The risk of privacy leakage is extremely high. Although the Lai solution and the He solution have the function of hiding policies, when the adversary builds a large amount of unpopular content with the increase of nodes, the two solutions obviously do not have the ability to resist such attacks, and the system tends to collapse. The risk of cache privacy of the Lai solution tends to be 2.4, and the risk of cache privacy of the He solution constantly changes. The two solutions both have the risk of privacy leakage. The introduction of the blockchain technology in the present disclosure can make up for the two deficiencies of the three solutions. The CSP in the present disclosure is responsible only for storing ciphertext and does not have the permission to control access. The adversary does not have the private key of the consumer and therefore cannot decrypt the ciphertext. Hijacking attacks and third-party attacks are ineffective against the present disclosure. In addition, the ciphertext address and access are recorded on the blockchain in the present disclosure. This greatly improves sensitivity of the system and can effectively prevent cache pollution attacks. The stable risk of cache privacy is only 2.12.

FIGS. 6A-6D show comparison between the time taken for content retrieval in the solutions. At the initial stage of the experiment, the quantity of nodes keeps increasing, relevant information tables and caches in the nodes of each solution are gradually filled, and the time required to accept and process the content gradually increases. As the experiment continues to run, the cached content with a higher hit rate in the node gradually replaces the cached content with a lower hit rate, and the retrieval time of the content of each solution gradually decreases. However, in the Lai solution, regardless of whether the content is popular or not, transmission of the content is controlled by a third-party server. Conversion and storage are all access structures completed by a semi-trusted agent. The consumers must receive the agent's key to obtain the content. Therefore, the Lai solution is not dominant in terms of the content retrieval delay, and the content retrieval delay is almost 200 ms. When the other three solutions face this change, the publisher encrypts a to-be-distributed data packet only once, such that the consumers only need to receive the key to decrypt the content. Therefore, less computational costs and processing time are required. However, the Waters solution relies on overall performance of the CCN. When an edge node processes data packets and interest packets, bandwidth resources and processing time are slightly larger, and the maximum delay reaches 220 ms. Based on the advantages of the He solution, the present disclosure adds the CSP to store and distribute the ciphertext. Although the content data retrieval delay increases with the increase of the quantity of nodes, the delay is always kept at a value lower than one second. In addition, the consumers can retrieve content of interest only by browsing transaction records on the consortium blockchain. This saves the time of matching in the CR. When the quantity of nodes reaches 20, the content retrieval delay of the present disclosure is almost stable, does not increase significantly, and the stable delay is less than 150 ms. This proves that the present disclosure can preserve the data retrieval delay at a low level, and the delay does not increase significantly with the increase of the network size.

The present disclosure introduces the blockchain as a trusted third party and proposes a secure CCN content sharing method based on CP-ABE and the blockchain. The present disclosure introduces the blockchain to implement distributed and trusted access control, record behavior of nodes in a behavior ledger, trace the entire process of content sharing, and locate a malicious node. In addition, to implement fine-grained access by the consumers to content, CP-ABE based on LSSS is used to implement one-to-many content sharing, hide policies, and achieve fast authentication and more flexible expression. The security analysis shows that the present disclosure implements confidentiality of content sharing and resistance to collusion attacks and CSP attacks. The experimental results show that the present disclosure ensures security of access policies, data non-tampering, and traceability and has a short content retrieval delay.

The foregoing descriptions are merely preferred embodiments of the present disclosure and not intended to limit the present disclosure. Any modifications, equivalent replacements, improvements, and the like made within the spirit and principle of the present disclosure shall all fall within the protection scope of the present disclosure.

What is claimed is:

1. A blockchain-based privacy protection method for a content centric network (CCN), comprising the following steps:
   (1) initialization: allocating, by a system, identifiers (IDs) aid to trusted attribute authorization centers (AACs); and executing, by the trusted AAC, an initialization algorithm by using a security parameter to generate common parameters and a master key;

(2) key generation: allocating, by the trusted AAC, a unique ID to each valid consumer and publisher, and generating a public key and a private key for each consumer and publisher; and randomly generating, by the trusted AAC, its own public key and private key;

(3) encryption: communicating, by the trusted AACs, with each other to jointly calculate a public key SPK, and broadcasting the public key; and generating ciphertext CT and uploading the ciphertext CT to a cloud service provider (CSP);

(4) transaction on-chaining: packaging, by the consumer, the ciphertext CT with a hidden access policy into a storage transaction by using the private key of the consumer, and sending the storage transaction to high-level consortium blockchain miners (HCBMs); and broadcasting, by the consumer, the storage transaction to consortium blockchain miners (CBMs) of a consortium blockchain, and verifying, by the HCBMs, validity of the storage transaction through a signature, and verifying validity of the ciphertext CT through a check code; and (5) decryption: when the consumer wants to obtain content of interest, finding, by the consumer, transaction information of the content on the consortium blockchain, sending an interest packet based on the transaction information, and finding a corresponding CSP through a storage address in the transaction information to obtain ciphertext CT; generating, by the consortium blockchain, an access transaction based on access information of the consumer; receiving, by a cache router (CR) closest to the CSP, the ciphertext CT, and sending the ciphertext CT to the consumer in a form of a data packet; and locally decrypting, by the consumer, the ciphertext CT, and verifying correctness of the content on the consortium blockchain.

2. The blockchain-based privacy protection method for the CCN according to claim 1, wherein step (1) comprises: generating a bilinear parameter $\Phi=\{G_0,G_1,e\}$ by using a security parameter $\lambda$ and a bilinear parameter generator, wherein an order of a multiplicative group $G_0$ is p and g represents a generator of the multiplicative group $G_0$; selecting a bilinear pairing $e:G_0 \times G_0 \rightarrow G_1$ as a bilinear mapping; randomly selecting an integer $\alpha \in Z_p$ as the master key MSK; and calculating $h=g^\alpha$ and establishing the global parameters Params=$\{\Phi,h,H\}$, wherein $H:\{0,1\}^* \rightarrow G_0$ represents a hash function, * represents random selection, $Z_p$ represents an integer set, and h represents the calculated global parameter.

3. The blockchain-based privacy protection method for the CCN according to claim 2, wherein step (2) comprises:
allocating, by the trusted AAC, the unique ID uid to each valid consumer and publisher, randomly selecting an integer $t_{uid} \in Z_p$ as the private key $SK_{uid}=\{t_{uid}\}$ of the consumer or publisher, calculating $g^{1/t_{uid}\alpha}$ and $g^{1/t_{uid}}$ as the public key $PK_{uid}=\{g^{1/t_{uid}\alpha},g^{1/t_{uid}}\}$ of the consumer or publisher, and sending the private key and the public key to the consumer or the publisher, wherein g represents a generator, $\alpha$ represents the master key, and $Z_p$ represents the integer set; and randomly selecting, by the trusted AAC, an integer $r \in Z_p$ as its own private key $SK_{aid}=\{r\}$ and calculating a bilinear mapping $e(g,g)^{r_i}$ as its own public key $PK_{aid}=\{e(g,g)^r\}$.

4. The blockchain-based privacy protection method for the CCN according to claim 1, wherein step (2) comprises:
allocating, by the trusted AAC, the unique ID uid to each valid consumer and publisher, randomly selecting an integer $t_{uid} \in Z_p$ as the private key $SK_{uid}=\{t_{uid}\}$ of the consumer or publisher, calculating $g^{1/t_{uid}\alpha}$ and $g^{1/t_{uid}}$ as the public key $PK_{uid}=\{g^{1/t_{uid}\alpha},g^{1/t_{uid}}\}$ of the consumer or publisher, and sending the private key and the public key to the consumer or the publisher, wherein g represents a generator, $\alpha$ represents the master key, and $Z_p$ represents the integer set; and randomly selecting, by the trusted AAC, an integer $r \in Z_p$ as its own private key $SK_{aid}=\{r\}$, and calculating a bilinear mapping $e(g,g)^{r_i}$ as its own public key $PK_{aid}=\{e(g,g)^r\}$.

5. The blockchain-based privacy protection method for the CCN according to claim 4, wherein step (3) comprises:
after the initialization, broadcasting, by the trusted AACs, bilinear pairings $e(g,g)^{t_i}$; and after receiving all bilinear pairings, calculating, by the trusted AACs, the public key $SPK=e(g,g)^r$, wherein r represents the private key $SK_{aid}$ of the trusted AAC;

randomly selecting n−1 integers $y_2 \ldots y_n$ for shared encryption; selecting a random vector $v=(s, y_2, y_3, \ldots, y_n)^T$, wherein s represents a secret index to be shared; and calculating an intermediate variable $\lambda_i=v \times M_i$, wherein $1 \leq i \leq l$, $M_i$ represents a row vector of an l×n matrix M, $\lambda_i$ represents an $i^{th}$ share obtained by dividing the secret index s, and v represents the random vector formed by an access control policy;

calculating an intermediate variable $w_i=M_iZ$, wherein Z represents a random integer; and calculating $C_0, C_1, C_2, C_3, C_4$, wherein $C_0=me(g,g)^{st}$, $C_1=h^s$, $C_2=H(e(g,g)^{ys})$, $C_3=h^{\lambda_i}$, $C_4=H(\beta(i))$, $C_0=me(g,g)^{st}$ represents multiplication of plaintext m and the bilinear pairing, st represents a randomly selected secret parameter, y represents a random vector, and $\beta(i)$ represents a row-specific attribute; and uploading, by the consumer, the ciphertext CT=$\{C_0, C_1, C_2, C_3, C_4\}$ to the CSP for storage.

6. The blockchain-based privacy protection method for the CCN according to claim 1, wherein packaging the storage transaction comprises: calculating a hash value CheckCode of the ciphertext by using a hash function $H:\{0,1\}^* \rightarrow G_0$, wherein CheckCode=H(CT); calculating a hash value MD=H(H(m),Address,$Sign_{BSK_{uid}}$,CheckCode) of the transaction, wherein m represents plaintext, and $Sign_{BSK_{uid}}$ represents a signature; generating a signature Sign=$Sign_{SK_{uid}}$(MD) for the hash value MD of the transaction by using the private key $SK_{uid}$ of the consumer, wherein $Sign_{SK_{uid}}()$ represents signature calculation; and generating the storage transaction $Tx_{storage}$=(H(m),Address,Sign, CheckCode).

7. The blockchain-based privacy protection method for the CCN according to claim 6, wherein the HCBMs compare a hash value MD' of the received storage transaction $Tx_{storage}$ with the hash value of the transaction generated when the signature Sign is verified by using the public key $BPK_{uid}$ broadcast by the publisher to verify the validity of the storage transaction $Tx_{storage}$, which comprises:
calculating the hash value MD'=H(T,Address,Sign, CheckCode) of the transaction by using the hash function, wherein T represents a timestamp;

verifying the signature Sign by using the public key $DPK_{uid}$ used by the consumer for signature to obtain the hash value MD=$Computer_{BPK_{uid}}$(Sign), wherein $Computer_{BPK_{uid}}()$ represents the process of verifying the signature by using the public key $DPK_{uid}$; and when MD'=MD, obtaining an address of the ciphertext CT based on Address and calculating a hash value CheckCode'=H(CT) of the ciphertext CT; when CheckCode'=CheckCode, the verification succeeds; otherwise, the verification fails.

8. The blockchain-based privacy protection method for the CCN according to claim 1, wherein the HCBMs compare a hash value MD' of the received storage transaction $Tx_{storage}$ with the hash value of the transaction generated when the signature Sign is verified by using the public key $BPK_{uid}$ broadcast by the publisher to verify the validity of the storage transaction $Tx_{storage}$, which comprises:

calculating the hash value MD'=H(T,Address,Sign, CheckCode) of the transaction by using the hash function, wherein T represents a timestamp;

verifying the signature Sign by using the public key $DPK_{uid}$ used by the consumer for signature to obtain the hash value MD=Computer$_{BPK_{uid}}$(Sign), wherein Computer$_{BPK_{uid}}$( ) represents the process of verifying the signature by using the public key $DPK_{uid}$; and when MD'=MD, obtaining an address of the ciphertext CT based on Address and calculating a hash value CheckCode'=H(CT) of the ciphertext CT; when CheckCode'=CheckCode, the verification succeeds; otherwise, the verification fails.

9. The blockchain-based privacy protection method for the CCN according to claim 8, wherein generating the access transaction in step (5) comprises:

calculating a hash value H(Content$_{name}$) of a content name Content$_{name}$ by using the hash function; calculating the hash value MD=H (uid,Address$_{uid}$,Sign,H (Content$_{name}$)) of the transaction; generating a signature Sign=Sign$_{SK_{uid}}$(MD) for the hash value MD by using the private key $SK_{uid}$ of the consumer; and generating the access transaction $Tx_{proof}$=(uid,Address$_{uid}$,Sign,H(Content$_{name}$)).

10. The blockchain-based privacy protection method for the CCN according to claim 9, wherein verifying the validity of the access transaction $Tx_{proof}$ through the signature comprises: comparing, by the CBMs, a hash value MD' of the received access transaction $Tx_{proof}$ with a message digest MD generated when the signature Sign is verified by using the public key $BPK_{uid}$ broadcast by the publisher to verify the validity of the access transaction $Tx_{proof}$, which comprises:

calculating the hash value MD'=H (uid,Address$_{uid}$,Sign, H(Content$_{name}$)) of the transaction by using the hash function; verifying the signature Sign by using the public key $DPK_{uid}$ to obtain the hash value MD=Computer$_{BPK_{uid}}$(Sign); when MD'=MD, finding a hash value H'(Content$_{name}$) of the content name in the interest packet based on the address Address$_{uid}$; when H(Content$_{name}$)=H'(Content$_{name}$), indicating that the verification succeeds; otherwise, indicating that the verification fails, wherein H represents the hash function;

generating an access transaction $Tx_{access}$ by the consumer comprises: when the access transaction $Tx_{proof}$ is valid, obtaining a time time when the access transaction $Tx_{access}$ is generated; and calculating a hash value MD=H(A,uid,Address$_{store}$,Sign,BPK$_{uid}$,time) of the access transaction, wherein A represents an ID of the access transaction; and generating a signature sign=Sign$_{BSK_{uid}}$(MD) for the hash value MD by using the public key $BPK_{uid}$ of the publisher; obtaining the access transaction $Tx_{access}$=(A, uid,Address$_{store}$,sign,BPK$_{uid}$,time); otherwise, returning a null value; wherein time represents the time when the access transaction $Tx_{access}$ is generated, and Sign is used to prove that the access transaction $Tx_{access}$ is sent by the consumer.

11. The blockchain-based privacy protection method for the CCN according to claim 10, wherein decrypting the ciphertext by the consumer comprises:

selecting, by the trusted AAC, a random number $a_i \in Z_p$ for an attribute $x_i$, wherein a consumer attribute set is S=($x_1, x_2, x_3, \ldots, x_n$), 1<t<n, $x_i$ represents an attribute of the consumer, and n represents a quantity of consumer attributes;

generating, by the trusted AAC, a key $$SK_{uid,aid} = \left\{ D_1 : g^{\frac{r_i+\alpha}{ar_i}}, D_2 : \forall a_i \in S : g^{\frac{k}{r_i}} H(a_i)^{r_{a_i}}, D_3 : h^{r_{a_i}} \right\},$$

wherein k, α, and $r_{a_i}$ are calculated security parameters, and D1, D2, and D3 are key parameters;

after receiving the ciphertext CT, pre-calculating, by the consumer, the ciphertext CT as follows:

$$P_x = \prod_{x \in I} \left( \frac{e(D_2, C_3)}{e(D_3, C_4)} \right) = e(g,g)^{\frac{ks\alpha}{r_z}}$$

$$C_x = \prod_{z=1}^{k} \frac{e(C_1, D_1)}{P_x}$$

wherein I represents an access attribute, x represents the attribute of the consumer, s represents a secret value, $C_x$ represents a calculated value of the consumer attribute, and $P_x$ represents a pre-calculated value of the consumer attribute; and decrypting, by the consumer, the ciphertext by using the key $SK_{uid,aid}$, and calculating the plaintext as follows:

$$m = \frac{CT}{(C_4)^{SK_{uid,aid}}}.$$

12. The blockchain-based privacy protection method for the CCN according to claim 1, wherein decrypting the ciphertext by the consumer comprises:

selecting, by the trusted AAC, a random number $a_i \in Z_p$ for an attribute $x_i$, wherein a consumer attribute set is S=($x_1, x_2, x_3, \ldots, x_n$), 1<t<n, $x_i$ represents an attribute of the consumer, and n represents a quantity of consumer attributes;

generating, by the trusted AAC, a key $$SK_{uid,aid} = \left\{ D_1 : g^{\frac{r_i+\alpha}{ar_i}}, D_2 : \forall a_i \in S : g^{\frac{k}{r_i}} H(a_i)^{r_{a_i}}, D_3 : h^{r_{a_i}} \right\},$$

wherein k, α, and $r_{a_i}$ are calculated security parameters, and D1, D2, and D3 are key parameters;

after receiving the ciphertext CT, pre-calculating, by the consumer, the ciphertext CT as follows:

$$P_x = \prod_{x \in I} \left( \frac{e(D_2, C_3)}{e(D_3, C_4)} \right) = e(g,g)^{\frac{ks\alpha}{r_z}}$$

-continued $$C_x = \prod_{z=1}^{k} \frac{e(C_1, D_1)}{P_x}$$

wherein I represents an access attribute, x represents the attribute of the consumer, s represents a secret value, $C_x$ represents a calculated value of the consumer attribute, and $P_x$ represents a pre-calculated value of the consumer attribute; and decrypting, by the consumer, the ciphertext by using the key $SK_{uid,aid}$, and calculating the plaintext as follows:

$$m = \frac{CT}{(C_4)^{SK_{uid,aid}}}.$$

13. The blockchain-based privacy protection method for the CCN according to claim 1, wherein when obtaining the plaintext m, the consumer calculates a hash value of the plaintext m and forms a verification transaction on the consortium blockchain, which comprises:

calculating the hash value H'(m) of the plaintext m by using the hash function H:{0,1}*→$G_0$; and finding a hash value H(m) of the plaintext in the storage transaction $Tx_{storage}$;

when H(m)=H'(m), Code=true; otherwise, Code=false;

obtaining a time time when the transaction is generated; and calculating a hash value MD=H(time,uid,H(m), $Tx_{storage}$,Sign,Code) of the transaction;

generating a signature Sign=$Sign_{SK_{uid}}$(MD) for the hash value MD by using the private key $SK_{uid}$ of the consumer; and generating the verification transaction $Tx_{verify}$=(time,uid,H(m),$Tx_{storage}$,Sign,Code); and after the verification transaction $Tx_{verify}$ is generated, broadcasting the verification transaction $Tx_{verify}$ to the CBMs of the consortium blockchain for verification, which comprises:

calculating a hash value MD'=H(time,uid,H(m), $Tx_{storage}$,Sign,Code) of the transaction by using the hash function;

verifying the signature Sign by using the public key $BSK_{uid}$ to obtain the hash value MD=$Computer_{BPK_{uid}}$(Sign); and when MD'=MD, indicating that the verification succeeds; otherwise, indicating that the verification fails.

* * * * *